United States Patent
Blais (10) Patent No.: US 10,716,216 B2
(45) Date of Patent: Jul. 14, 2020

(54) PIXELIZED THERMAL CONDUCTIVITY DETERMINATION FOR PRINTED CIRCUIT BOARDS

(71) Applicant: Mentor Graphics Corporation, Wilsonville, OR (US)

(72) Inventor: Paul Richard Blais, South Burlington, VT (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/157,856

(22) Filed: Oct. 11, 2018

(65) Prior Publication Data
US 2019/0132955 A1    May 2, 2019

Related U.S. Application Data

(60) Provisional application No. 62/580,418, filed on Nov. 1, 2017.

(51) Int. Cl.
| | | |
|---|---|---|
| G06F 30/367 | (2020.01) | |
| G06F 119/08 | (2020.01) | |
| H05K 3/00 | (2006.01) | |
| H05K 1/02 | (2006.01) | |

(52) U.S. Cl.
CPC ......... H05K 3/0005 (2013.01); G06F 30/367 (2020.01); H05K 1/0209 (2013.01); *G06F 2119/08* (2020.01)

(58) Field of Classification Search
USPC ....................................................... 716/137
See application file for complete search history.

(56) References Cited

U.S. PATENT DOCUMENTS

2012/0072161 A1 *  3/2012  Matsushita ......... G06F 17/5009
                                                              702/130

* cited by examiner

*Primary Examiner* — Bryce M Aisaka (57) ABSTRACT

Various aspects of the disclosed technology relate to pixel-based thermal conductivity determination. A pixelized representation is created for a conductor layer of a printed circuit board. The pixelized representation is analyzed to identify conductor paths in a direction. Based on the conductor paths, the conductor pixels separated into net pixels and isolated pixels. An effective thermal conductivity property value in the direction is then computed for a section or a whole of the conductor layer based on the number of the isolated pixels, the number of the net pixels and the number of total pixels in the section or the whole of the conductor layer.

18 Claims, 7 Drawing Sheets

Flow chart 300

Flow chart 300

PIXELIZED THERMAL CONDUCTIVITY DETERMINATION FOR PRINTED CIRCUIT BOARDS

RELATED APPLICATIONS

This application claims the benefit of U.S. Provisional Patent Application No. 62/580,418, filed on Nov. 1, 2017, titled "Pixelized Thermal Conductivity Determination For Printed Circuit Boards," and naming Paul Richard Blais as the inventor, which application is incorporated entirely herein by reference.

FIELD OF THE DISCLOSED TECHNIQUES

The presently disclosed techniques relates to thermal simulation aspects of product design. Various implementations of the disclosed techniques may be particularly useful for determining effective thermal conductivity values for a section or a whole of a layer of a printed circuit board.

BACKGROUND OF THE DISCLOSED TECHNIQUES

High operating temperatures can severely affect the performance, power consumption and reliability of a circuit system. With the continued scaling of integrated circuit technologies, high power density and the resulting difficulties in managing temperatures have become a major challenge facing designers at all design levels. Computer modeling tools have been employed to predict and simulate the thermal behavior of both physical and virtual structures.

A printed circuit board is typically a layered composite consisting of copper foil and a glass-reinforced polymer (FR-4). It mechanically supports and electrically connects electronic components or electrical components. Printed circuit boards are used in all but the simplest electronic products. They are also used in some electrical products, such as passive switch boxes. A common type of printed circuit board is usually 10 cm wide, 15 cm long and a few millimeters thick. Printed circuit boards can be singled sided, double sided and multilayered. Multilayer printed circuit boards have one or multiple conductor patterns (layers) inside the board, insolated by dielectric layers. This increases the area available for wiring. A smart phone may have a printed circuit board consisting of more than ten layers. Through the conductor layers, a printed circuit board can help to remove component heat. To preserve component reliability, efficient thermal design and management is needed.

When performing a steady-state thermal analysis on a printed circuit board, one of the critical parameters is the effective thermal conductivity. The accuracy of the effective thermal conductivity value for each of the printed circuit board layers can determine the accuracy of the thermal model. No two printed circuit boards are designed alike, but employing an accurate three-dimensional model to predict temperature distribution takes an excessive amount of time. A current method takes a digital image of each layer and converts it into a black and white image. Black is assigned to conductor and white assigned to dielectric. The image is then divided into patches based on inputs from the user. These patches are then converted into effective thermal conductivities by analyzing each row and column. This process often leads to under-prediction of effective thermal conductivities and the use of a correction factor to make up for this error.

BRIEF SUMMARY OF THE DISCLOSED TECHNIQUES

Various aspects of the disclosed technology relate to pixel-based thermal conductivity determination. In one aspect, there is a method, executed by at least one processor of a computer, comprising: receiving data of a printed circuit board; creating a pixelized representation for a conductor layer of the printed circuit board based on the data of a printed circuit board, the pixelized representation having two types of pixels: conductor pixels and dielectric pixels; analyzing the pixelized representation to identify conductor paths in a direction, the conductor paths being formed by some or all of the conductor pixels; analyzing the pixelized representation to separate the conductor pixels into net pixels and isolated pixels, the net pixels being pixels on at least one of the conductor paths, and the isolated pixels being pixels on none of the conductor paths; computing an effective thermal conductivity property value in the direction for a section or a whole of the conductor layer based on a number of the isolated pixels, a number of the net pixels and a number of total pixels in the section or the whole of the conductor layer; and storing the effective thermal conductivity property value on a non-transitory computer-readable medium.

The computing an effective thermal conductivity property value in the direction may comprise: computing an equivalent heat flow thermal conductivity value in the direction for the section or the whole of the conductor layer based on heat flow thermal conductivity values for lines of pixels, each of the lines of pixels extending from one side of the section or the whole of the conductor layer to other side of the section or the whole of the conductor layer in a second direction, the second direction being perpendicular to the direction, the heat flow thermal conductivity value for each of the lines of pixels being determined based on a number of the net pixels in the each of the lines of pixels; and deriving the effective thermal conductivity property value in the direction by averaging the equivalent heat flow thermal conductivity value in the direction and an equivalent volume fraction thermal conductivity value in the direction and then by correcting the averaging result by a flow length correction factor.

The flow length correction factor may be determined by dividing length of the section or the whole of the conductor layer in the direction by an average length of the conductor paths.

The equivalent volume fraction thermal conductivity value in the direction may be computed based on, a conductor thermal conductivity value, an effective isolated thermal conductivity value for the section or the whole of the conductor layer, the number of the net pixels and the number of total pixels in the section or the whole of the conductor layer, the effective isolated thermal conductivity value being determined based on the conductor thermal conductivity value, a dielectric thermal conductivity value, and the number of the isolated pixels and the number of total pixels in the section or the whole of the conductor layer.

The conductor thermal conductivity value and the dielectric thermal conductivity value may be thermal conductivity values for copper and FR-4 (a woven fiberglass cloth impregnated with an epoxy resin), respectively. The equivalent volume fraction thermal conductivity value and the heat flow thermal conductivity values for the lines of pixels may be determined based a volume fraction approach, and the effective isolated thermal conductivity value and the equivalent heat flow thermal conductivity value may be determined based a series calculation approach.

In another aspect, there are one or more non-transitory computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

General Considerations

Various aspects of the disclosed technology relate to pixel-based thermal conductivity determination. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of a thermal modeling tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "create," "analyze," and "compute" to describe the disclosed method or the device function/structure. Such terms are high-level descriptions. The actual operations or functions/structures that correspond to these terms will vary depending on the particular implementation and are readily discernible by one of ordinary skill in the art.

Illustrative Operating Environment

Figure 1:
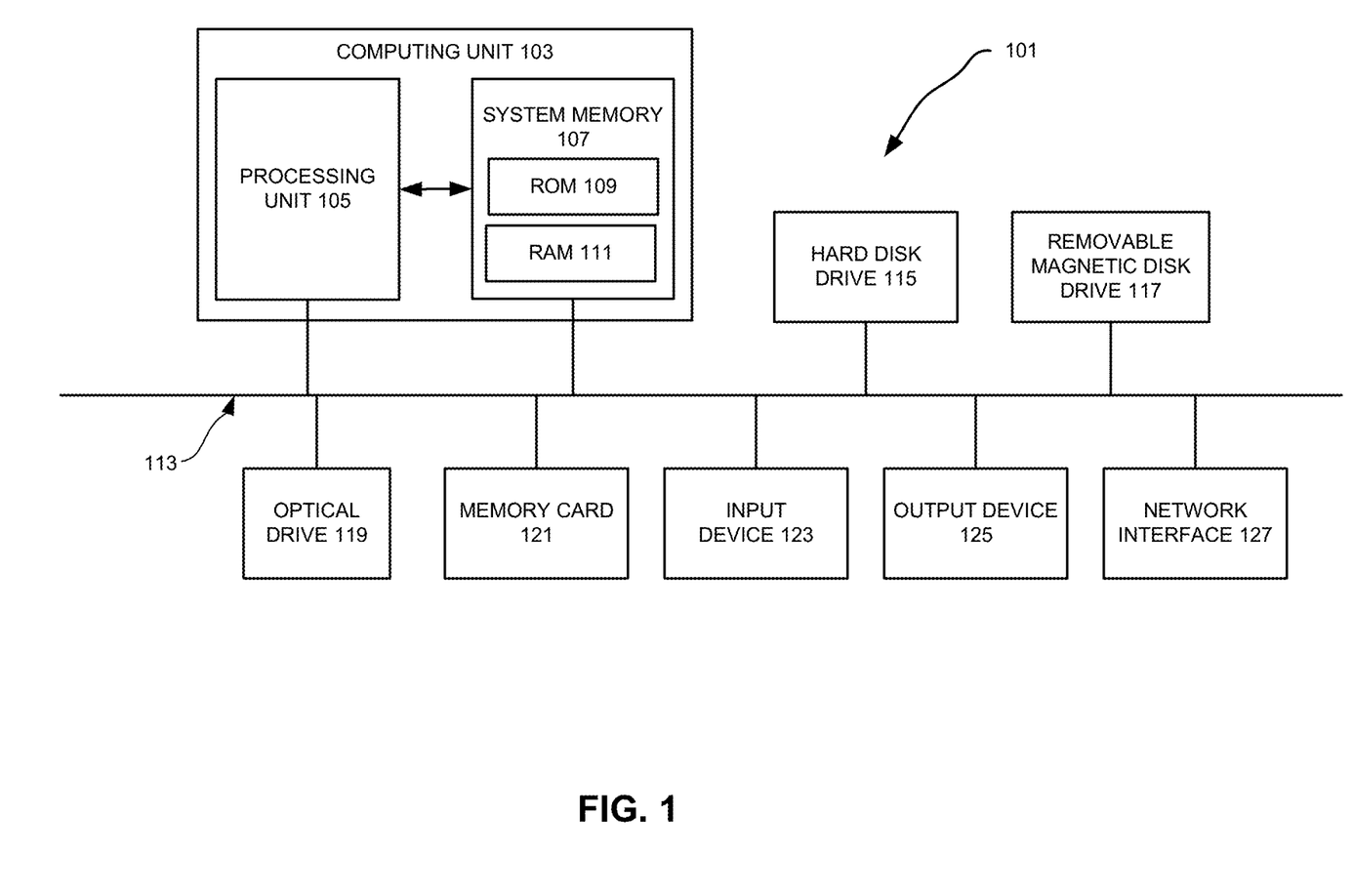
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but it will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it is not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Thermal Conductivity Determination Tool

Figure 2:
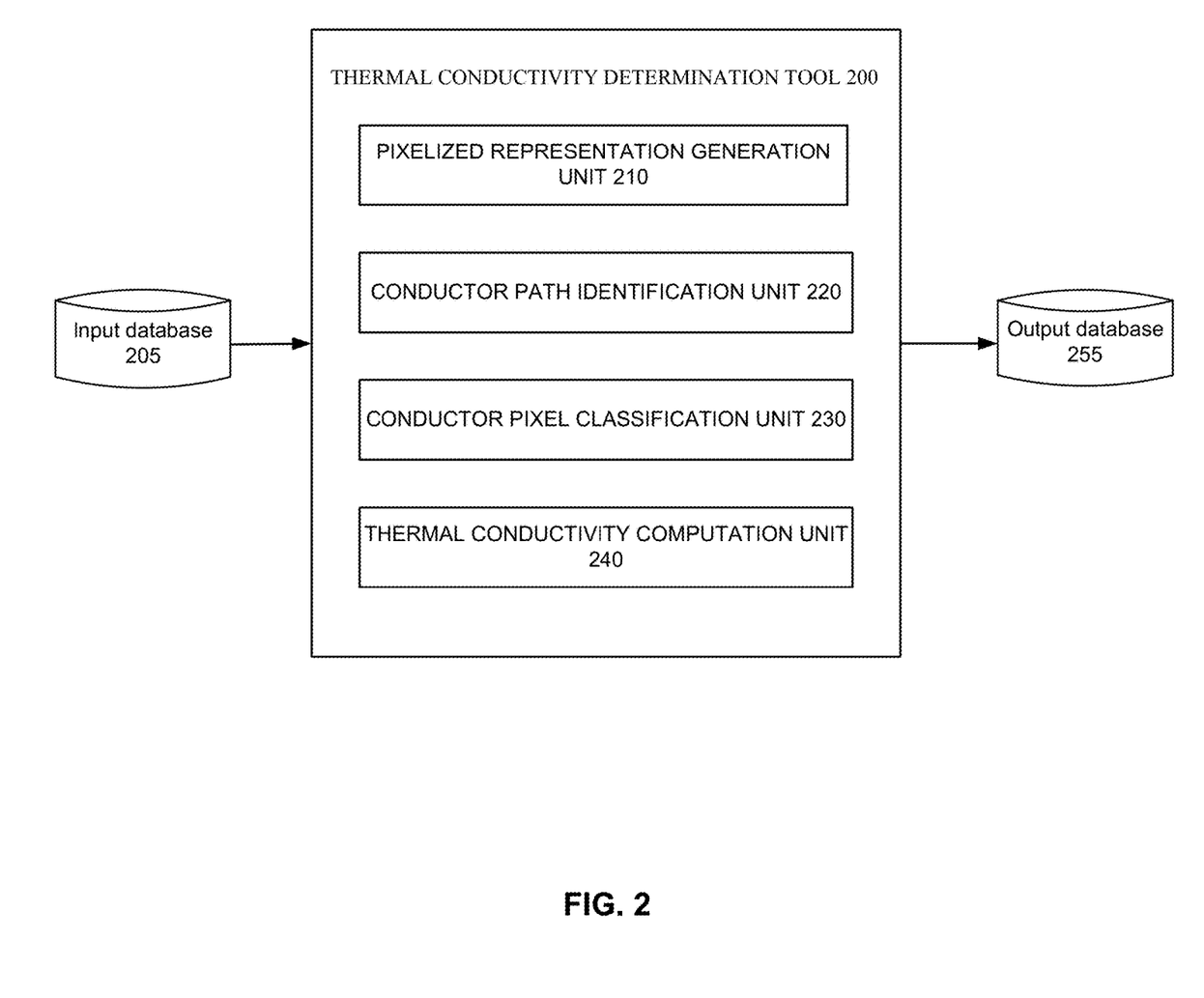
FIG. 2 illustrates an example of a thermal conductivity determination tool that may be implemented according to various embodiments of the disclosed technology.

FIG. 2 illustrates an example of a thermal conductivity determination tool 200 that may be implemented according to various embodiments of the disclosed technology. As seen in this figure, the thermal conductivity determination tool 200 includes a pixelized representation generation unit 210, a conductor path identification unit 220, a conductor pixel classification unit 230, and a thermal conductivity computation unit 240. Some implementations of the thermal conductivity determination tool 200 may cooperate with (or incorporate) one or both of an input database 205, and an output database 255.

As will be discussed in more detail below, the thermal conductivity determination tool 200 receives data of a printed circuit board from the input database 205. The pixelized representation generation unit 210 creates a pixelized representation for a conductor layer of the printed circuit board based on the data of a printed circuit board. The pixelized representation has two types of pixels: conductor pixels and dielectric pixels. The conductor path identification unit 220 analyzes the pixelized representation to identify conductor paths in a direction. The conductor paths are formed by some or all of the conductor pixels. The conductor pixel classification unit 230 analyzes the pixelized representation to separate the conductor pixels into net pixels and isolated pixels. The net pixels are pixels on at least one of the conductor paths while the isolated pixels are pixels on none of the conductor paths. The thermal conductivity computation unit 240 computes an effective thermal conductivity property value in the direction for a section or a whole of the conductor layer based on a number of the isolated pixels, a number of the net pixels and a number of total pixels in the section or the whole of the conductor layer. The thermal conductivity determination tool 200 stores the effective thermal conductivity property value on a non-transitory computer-readable medium.

As previously noted, various examples of the disclosed technology may be implemented by one or more computing systems, such as the computing system illustrated in FIG. 1. Accordingly, one or more of the pixelized representation generation unit 210, the conductor path identification unit 220, the conductor pixel classification unit 230, and the thermal conductivity computation unit 240 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the pixelized representation generation unit 210, the conductor path identification unit 220, the conductor pixel classification unit 230, and the thermal conductivity computation unit 240. As used herein, the term "non-transitory computer-readable medium" refers to computer-readable medium that are capable of storing data for future retrieval and not propagating electro-magnetic waves. The non-transitory computer-readable medium may be, for example, a magnetic storage device, an optical storage device, or a solid state storage device.

It also should be appreciated that, while the pixelized representation generation unit 210, the conductor path identification unit 220, the conductor pixel classification unit 230, and the thermal conductivity computation unit 240 are shown as separate units in FIG. 2, a single computer (or a single processor within a master computer) or a single computer system may be used to implement all of these units at different times, or components of these units at different times.

With various examples of the disclosed technology, the input database 205 and the output database 255 may be implemented using any suitable computer readable storage device. That is, either of the input database 205 and the output database 255 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 205 and the output database 255 are shown as separate units in FIG. 2, a single data storage medium may be used to implement some or all of these databases.

Pixel-Based Thermal Conductivity Determination

Figure 3:
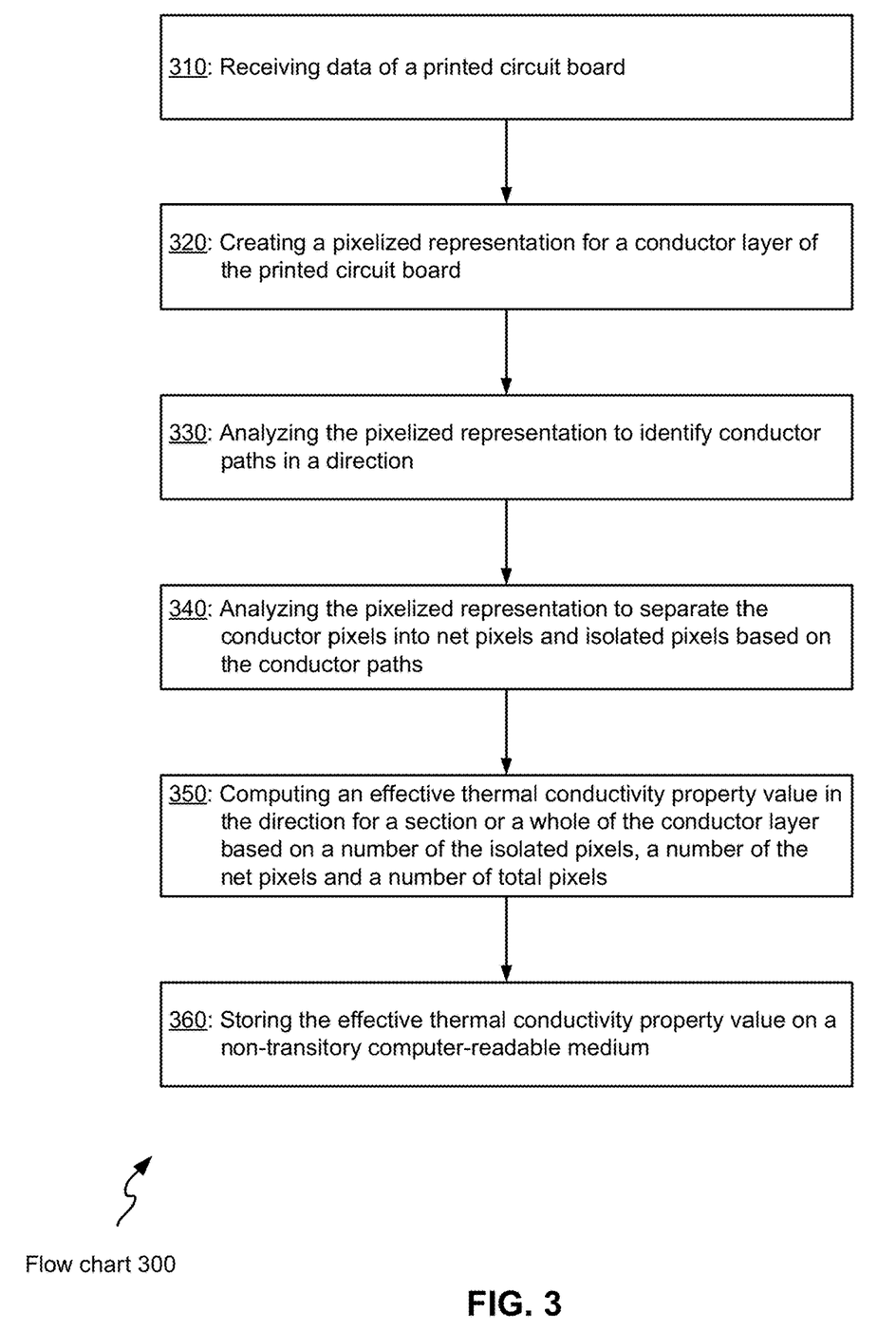
FIG. 3 illustrates a flowchart showing a process of pixel-based thermal conductivity determination that may be implemented according to various examples of the disclosed technology.

FIG. 3 illustrates a flowchart 300 showing a process of pixel-based thermal conductivity determination that may be implemented according to various examples of the disclosed technology. For ease of understanding, methods of pixel-based thermal conductivity determination that may be employed according to various embodiments of the disclosed technology will be described with reference to the thermal conductivity determination tool 200 illustrated in FIG. 2 and the flow chart 300 in FIG. 3. It should be appreciated, however, that alternate implementations of a thermal conductivity determination tool 200 may be used to perform the method of pixel-based thermal conductivity determination in the flow chart 300 according to various embodiments of the disclosed technology. In addition, it should be appreciated that implementations of the thermal conductivity determination tool 200 may be employed to implement methods of pixel-based thermal conductivity determination according to different embodiments of the disclosed technology other than the one illustrated by the flow chart 300 in FIG. 3.

In operation 310, the thermal conductivity determination tool 200 receives data of a printed circuit board from the input database 205. The data of a printed circuit board may comprise size and layer information of the printed circuit board. The layer information may comprise conductor topology information.

Figure 4A:
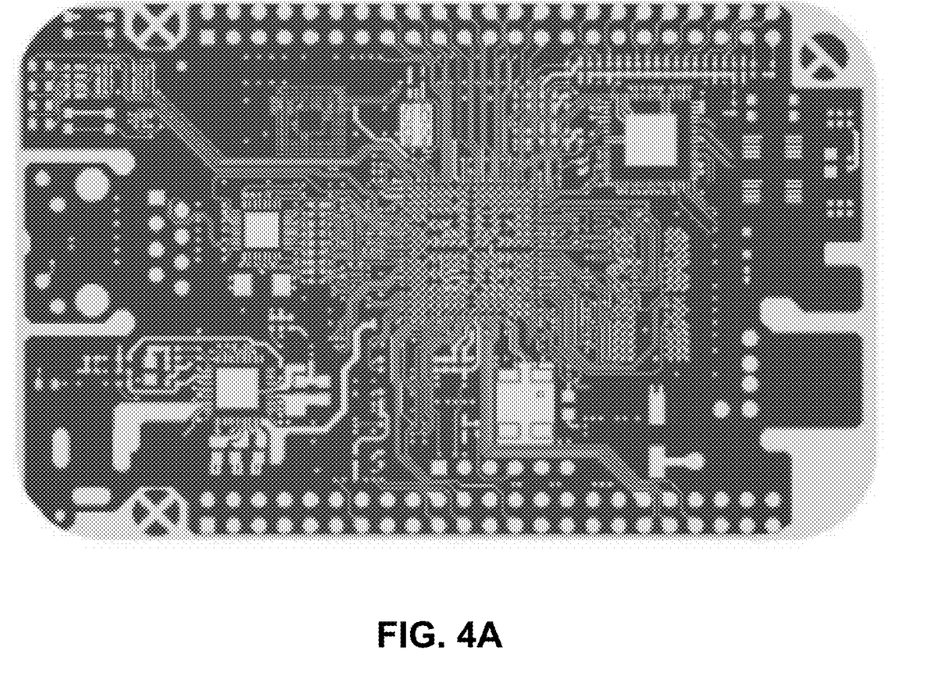
FIG. 4A shows an example of a conductor layer of a printed circuit board.
Figure 4B:
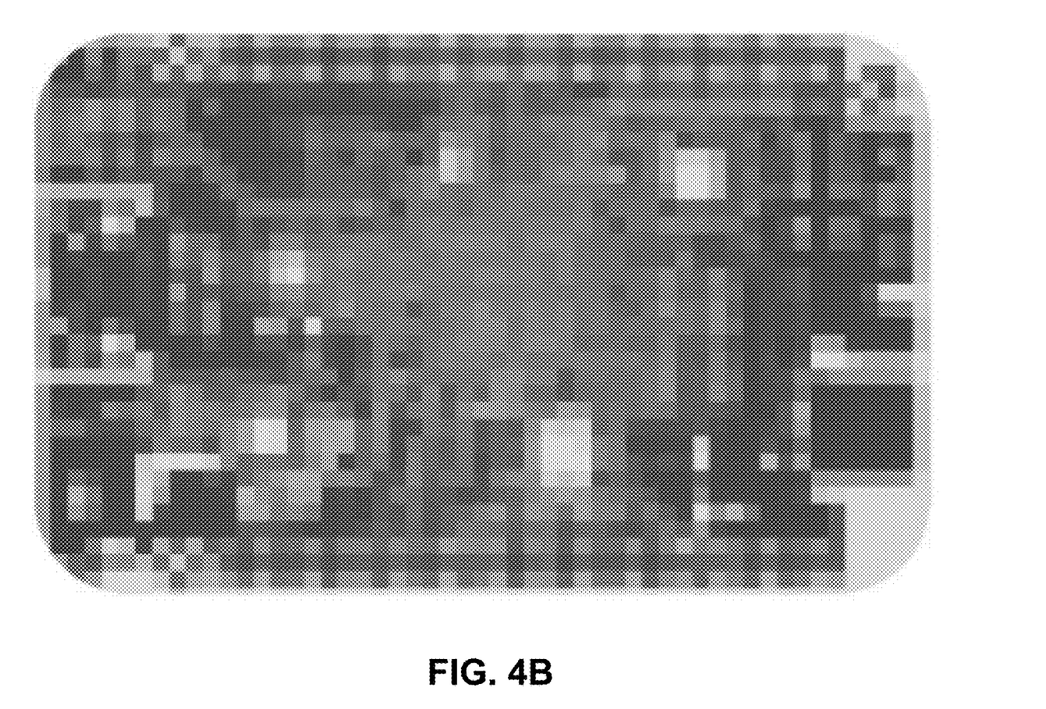
FIG. 4B shows an example of a pixelized representation of the conductor layer shown in FIG. 4A.

In operation 320, the pixelized representation generation unit 210 creates a pixelized representation for a conductor layer of the printed circuit board based on the data of a printed circuit board. The pixelized representation generation unit 210 may first extract a monotone image for each conductor layer in the printed circuit board and then process the images to create a pixelized representation for each conductor layer. FIG. 4A shows an example of a conductor layer of a printed circuit board. In the figure, the light color regions represent conductor material such as copper and the dark color regions represent dielectric such as FR-4. FIG. 4B shows an example of a pixelized representation of the conductor layer shown in FIG. 4A.

Figure 5:
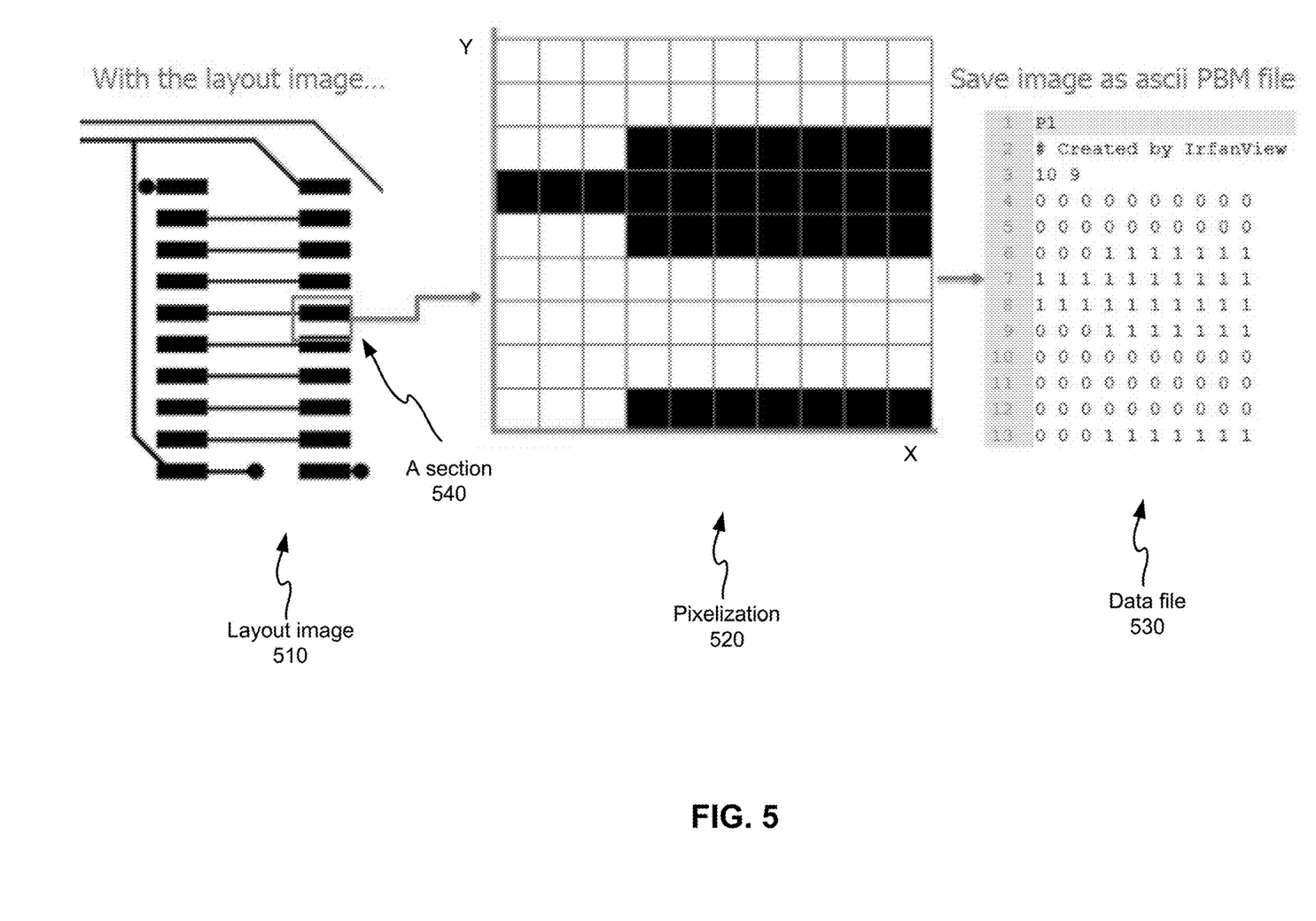
FIG. 5 illustrates a detailed example of the operation of pixelized representation generation according to some implementations of the disclosed technology.

FIG. 5 illustrates a detailed example of the operation 320 according to some implementations of the disclosed technology. In a layout image 510, a small section 540 is pixelized by a grid 520. The pixelization result is saved as an ASCII PBM file 530. Here, the number "1" represents a conductor pixel and the number "0" represents a dielectric pixel. The number of pixels to be used may be defined by the user, for example. The pixelized image data may be saved in a file type different from ASCII PBM.

A conventional method of pixel-based thermal conductivity determination typically computes effective thermal conductivity values based on the number of conductor pixels and the number dielectric pixels. For example, effective row/column thermal conductivities $k_{Row}/k_{Col}$ may be calculated first based on Eqs. (1) and (2), respectively:

$$\frac{1}{k_{Row}} = \frac{N_{1r}}{N_{Col}k_{Cond}} + \frac{N_{0r}}{N_{Col}k_{Die}} \quad (1)$$

$$\frac{1}{k_{Col}} = \frac{N_{1c}}{N_{Row}k_{Cond}} + \frac{N_{0c}}{N_{Row}k_{Die}} \quad (2)$$

where $N_{1r}$ and $N_{1c}$ represents the number of conductor pixels in the row and column, respectively, $N_{0r}$ and $N_{0c}$ represents the number of dielectric pixels in the row and column, respectively, $N_{Row}$ and $N_{Col}$ represents the total number of pixels in the column and row (or the number of row/column), respectively, and $k_{Cond}$ and $k_{Die}$ represents conductor thermal conductivity and dielectric thermal conductivity, respectively.

Based on $k_{Row}$ and $k_{Col}$, the conventional method of pixel-based thermal conductivity determination then derives in plane thermal conductivity in x direction (horizontal) $k_x$ and in y direction (vertical) $k_y$:

$$k_x = \frac{1}{N_{Row}} \sum k_{Row} \quad (3)$$

$$k_y = \frac{1}{N_{Col}} \sum k_{Col} \quad (4)$$

Using Eqs. (1)-(4), the effective thermal conductivity values for the section 540 are calculated to be 38.97 w/mk for the horizontal direction and 0.45 w/mk for the vertical direction. In comparison, the corresponding values derived by using a more rigorous three-dimension thermal model are 81.86 w/mk and 0.46 w/mk, respectively. The large discrepancy between the effective thermal conductivity values for the horizontal direction is at least in part due to the fact that the conventional method does not consider the thermal interaction between nets that cross rows. In this case, the three rows in the middle are attached and heat flows not just along each of the rows. To correct for it, the conventional method may multiple the above result by a factor or use other empirical correction method.

Figure 6:
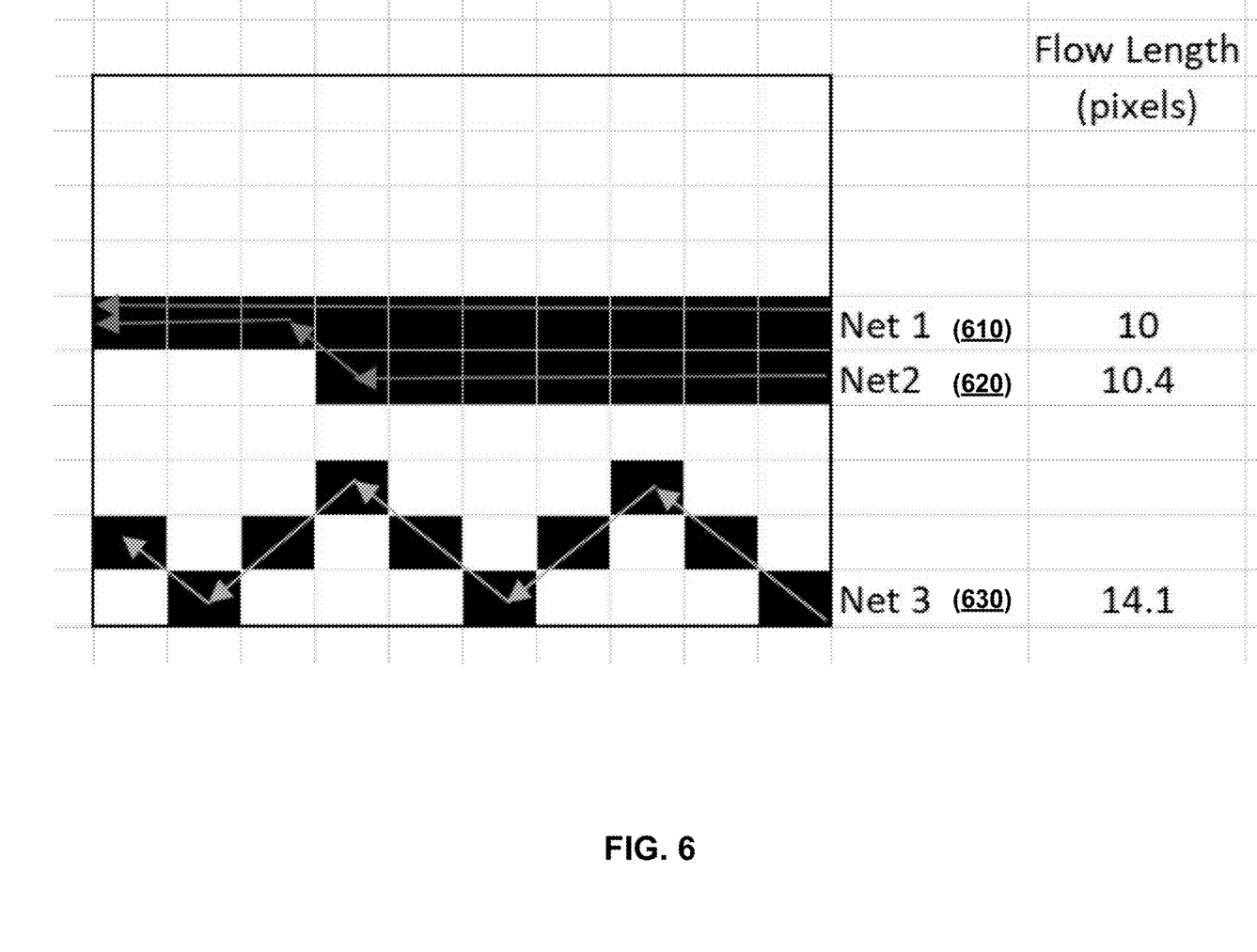
FIG. 6 illustrates an example of three conductor paths and their corresponding flow lengths.

Refer back to the flowchart 300. In operation 330, the conductor path identification unit 220 analyzes the pixelized representation to identify conductor paths in a direction. The conductor paths are formed by some or all of the conductor pixels. There are various ways to determine a conductor path. One example of determining a horizontal conductor path starts with going down one side (e.g., the far right side) column. The row being analyzed should be considered as the home row. For each conductor pixel, the method determines whether there is a pixel touching it that would continue heat conduction. If the answer is yes, the method goes to that new pixel and look for another pixel to conduct to. If the answer is no, the method stops and goes down to the next conductor pixel in the far right column. If the conductor path reaches the far left column, a conduction path is found. For each of the conductor paths, the conductor path identification unit 220 can determine a flow length value. The flow length can be measured from the center of one pixel to the center of the next pixel following the conductor path. The flow length unit may be pixels. As such, the flow length value adds one if the conductor path moves horizontally or vertically by one pixel and 1.41 pixels if the conductor path moves at an angle to the next pixel. FIG. 6 illustrates three conductor paths 610, 620 and 630, and their corresponding flow lengths.

In operation 340, the conductor pixel classification unit 230 analyzes the pixelized representation to separate the conductor pixels into net pixels and isolated pixels. A net pixel is a pixel on at least one of the conductor paths, and an isolated pixel is a pixel on none of the conductor paths. Here is an example of an algorithm the conductor pixel classification unit 230 may employed:

1) Determine total number of conductor pixels in the column (row). Initially, all pixels will be not-assigned (na_pixel).
2) Detect conductor paths that extend from one side of the column to the other. If a conductor pixel is determined to be in this conductor path, convert it to a net_pixel.
3) After completing the entire column, determine number of na_pixels. If zero, all have been converted and can stop.
4) Sweep down the column and detect if any net_pixels are touching na_pixels. If touching, convert na_pixel to net_pixel.
5) After completing sweep down (each row back and forth), determine number of na_pixels. If zero, all have been converted and can stop.
6) Sweep back up the column (in the other direction) and detect if any net_pixelsare touchngna_pixels. If touching, convert na_pixelto net_pixel.
7) After completing sweep up, determine number of na_pixels. If zero, all have been converted and can stop.
8) Convert any remaining na_pixelsto iso_pixels.

In operation 350, the thermal conductivity computation unit 240 computes an effective thermal conductivity property value in the direction for a section or a whole of the conductor layer based on a number of the isolated pixels, a number of the net pixels and a number of total pixels in the section or the whole of the conductor layer. According to some embodiments of the disclosed technology, the thermal conductivity computation unit 240 computes an equivalent heat flow thermal conductivity value in the direction for the section or the whole of the conductor layer based on heat flow thermal conductivity values for lines of pixels, and derives the effective thermal conductivity property value in the direction by averaging the equivalent heat flow thermal conductivity value in the direction and an equivalent volume fraction thermal conductivity value in the direction and then by correcting the averaging result by a flow length correction factor. Each of the lines of pixels extends from one side of the section or the whole of the conductor layer to the other side of the section or the whole of the conductor layer in a second direction, which is perpendicular to the direction. For example, the lines of pixels are rows of pixels for computing the effective thermal conductivity property value in the y direction and columns of pixels for computing the effective thermal conductivity property value in the x direction. The heat flow thermal conductivity value for a column of pixels ($k_{col\_hf}$) and the equivalent heat flow thermal conductivity value in the x direction ($k_{HF\_x}$) may be computed using the following equations:

$$k_{col\_hf} = \left(k_{Cond} * \frac{N_{Net\_in\_Col}}{N_{pixel\_in\_Col}}\right) + \left(k_{Die} * \frac{N_{Pixels\_in\_Col} - N_{Net\_in\_Col}}{N_{pixel\_in\_Col}}\right) \quad (5)$$

$$\frac{1}{k_{HF\_x}} = N_{col} \sum \frac{1}{k_{col\_hf}} \quad (6)$$

where $N_{pixel\_in_{col}}$ and $N_{net\_in\_col}$ are the total number of pixels and the number of net pixels in the column, respectively. The effective thermal conductivity property value in the x direction ($k_x$) can be derived according to the following equation:

$$k_x = \frac{(k_{VF_x} + k_{HF_x}) * Len_{cor\_x}}{2} \quad (7)$$

Here, the flow length correction factor ($Len_{cor\_x}$) can be derived according to the following equation:

$$Len_{cor\_x} = \frac{Len_{Patch}}{Len_{ave\_heat\_flow\_x}} \quad (8)$$

where $Len_{Patch\ is}$ the width of the patch (the section or whole of the conductor layer), $Len_{ave\_heat\_flow\_x}$ is the average length of all of the conductor paths found in the patch.

The equivalent volume fraction thermal conductivity value in the direction may be computed based on, a conductor thermal conductivity value, an effective isolated thermal conductivity value for the section or the whole of the conductor layer, the number of the net pixels and the number of total pixels in the section or the whole of the conductor layer. The effective isolated thermal conductivity value may be determined based on the conductor thermal conductivity value, a dielectric thermal conductivity value, and the number of the isolated pixels and the number of total pixels in the section or the whole of the conductor layer. The conductor thermal conductivity value and the dielectric thermal conductivity value may be thermal conductivity values for copper and FR-4 (a woven fiberglass cloth impregnated with an epoxy resin), respectively.

The equivalent volume fraction thermal conductivity value may be determined based a volume fraction approach, and the effective isolated thermal conductivity value may be determined based a series calculation approach. The following equations are an example for computing the equivalent volume fraction thermal conductivity value in the x direction ($k_{VF\_x}$) and the effective isolated thermal conductivity value ($k_{iso\_x}$):

$$k_{VF\_x} = \left(k_{Cond} * \frac{N_{Net\_x}}{N_{PBM}}\right) + \left(k_{iso\_x} * \frac{N_{PBM} - N_{Net\_x}}{N_{PBM}}\right) \quad (9)$$

$$\frac{1}{k_{iso\_x}} = \frac{N_{Iso\_x}}{N_{PBM} k_{Cond}} + \frac{N_{PBM} - N_{Iso\_x}}{N_{PBM} k_{Die}} \quad (10)$$

where $N_{PBM}$, $N_{Net\_x}$ and $N_{iso\_x}$ are the total number of pixels, the number of net pixels and the number of isolated pixels in the section or the whole of the conductor layer, respectively.

In operation 360, the thermal conductivity determination tool 200 stores the effective thermal conductivity property value in the output database 255.

Figure 7:
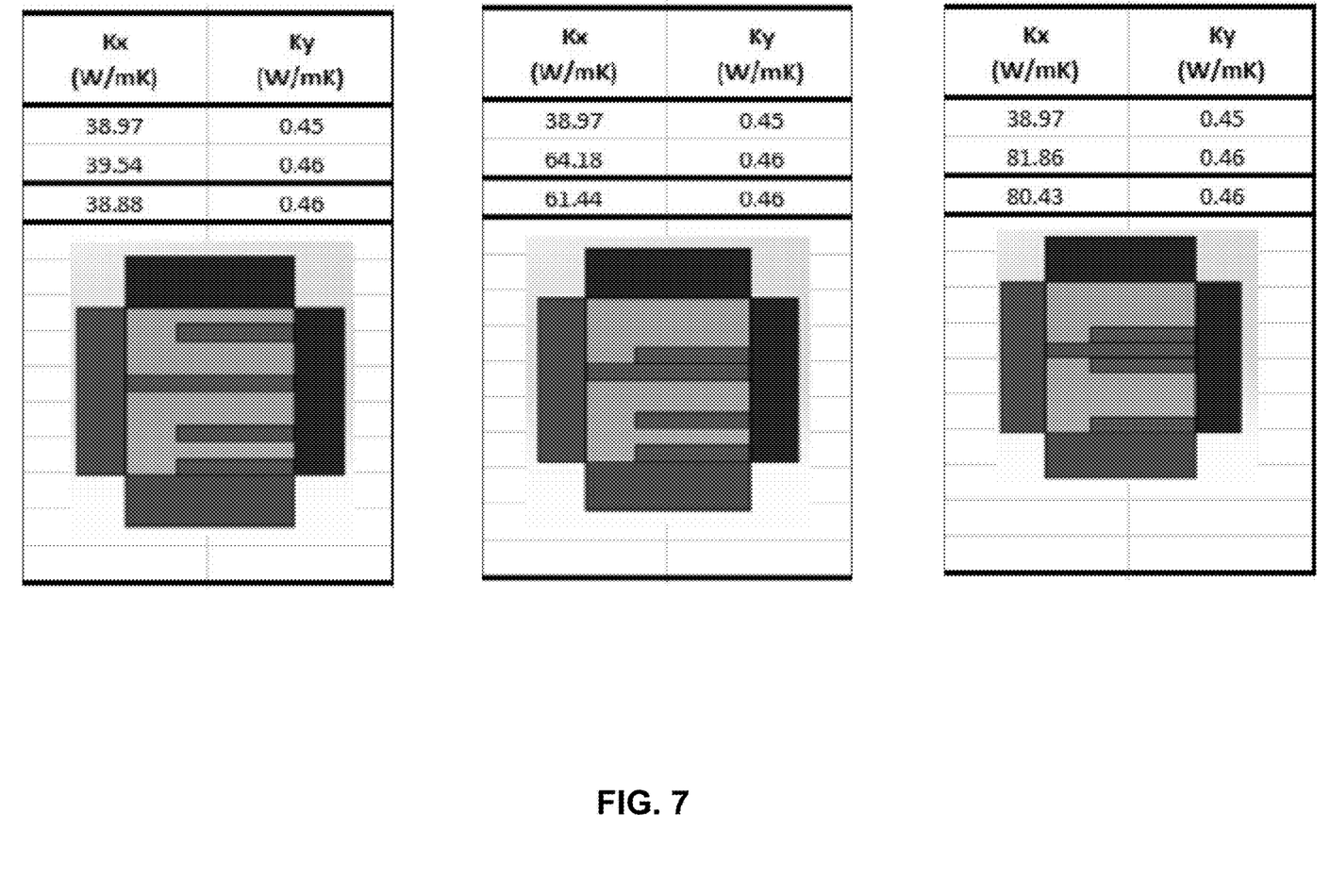
FIG. 7 illustrates an example comparing the thermal conductivity values determined by a conventional pixelized method (the first row), by a three-dimensional thermal model, and by a pixelized method according to an embodiment of the disclosed technology.

FIG. 7 illustrates an example comparing the thermal conductivity values determined by a conventional pixelized method (the first row), by a three-dimensional thermal model, and by a pixelized method according to an embodiment of the disclosed technology. When the conductor bars are not attached to each other (710), all three methods provide the same thermal conductivity values. When at least two conductor bars are attached (720 & 730), it is the pixelized method according to an embodiment of the disclosed technology, not the conventional pixelized method without correction, that derives the thermal conductivity values closely matching the ones derived by the more rigorous three-dimensional thermal model. This is because the conventional method does not capture heat flow between rows.

Conclusion

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A method, executed by at least one processor of a computer, comprising:
   receiving data of a printed circuit board;
   creating a pixelized representation for a conductor layer of the printed circuit board based on the data of a printed circuit board, the pixelized representation having two types of pixels: conductor pixels and dielectric pixels;
   analyzing the pixelized representation to identify conductor paths in a direction, the conductor paths being formed by some or all of the conductor pixels;
   analyzing the pixelized representation to separate the conductor pixels into net pixels and isolated pixels, the net pixels being pixels on at least one of the conductor paths, and the isolated pixels being pixels on none of the conductor paths;

computing an effective thermal conductivity property value in the direction for a section or a whole of the conductor layer based on a number of the isolated pixels, a number of the net pixels and a number of total pixels in the section or the whole of the conductor layer; and storing the effective thermal conductivity property value on a non-transitory computer-readable medium.

2. The method recited in claim 1, wherein the computing an effective thermal conductivity property value in the direction comprises:

computing an equivalent heat flow thermal conductivity value in the direction for the section or the whole of the conductor layer based on heat flow thermal conductivity values for lines of pixels, each of the lines of pixels extending from one side of the section or the whole of the conductor layer to other side of the section or the whole of the conductor layer in a second direction, the second direction being perpendicular to the direction, the heat flow thermal conductivity value for each of the lines of pixels being determined based on a number of the net pixels in the each of the lines of pixels; and deriving the effective thermal conductivity property value in the direction by averaging the equivalent heat flow thermal conductivity value in the direction and an equivalent volume fraction thermal conductivity value in the direction and then by correcting the averaging result by a flow length correction factor.

3. The method recited in claim 2, wherein the flow length correction factor is determined by dividing length of the section or the whole of the conductor layer in the direction by an average length of the conductor paths.

4. The method recited in claim 2, wherein the equivalent volume fraction thermal conductivity value in the direction is computed based on, a conductor thermal conductivity value, an effective isolated thermal conductivity value for the section or the whole of the conductor layer, the number of the net pixels and the number of total pixels in the section or the whole of the conductor layer, the effective isolated thermal conductivity value being determined based on the conductor thermal conductivity value, a dielectric thermal conductivity value, and the number of the isolated pixels and the number of total pixels in the section or the whole of the conductor layer.

5. The method recited in claim 4, wherein the conductor thermal conductivity value and the dielectric thermal conductivity value are thermal conductivity values for copper and FR-4 (a woven fiberglass cloth impregnated with an epoxy resin), respectively.

6. The method recited in claim 4, wherein the equivalent volume fraction thermal conductivity value and the heat flow thermal conductivity values for the lines of pixels are determined based a volume fraction approach.

7. One or more non-transitory computer-readable media storing computer-executable instructions for causing one or more processors to perform a method, the method comprising:

receiving data of a printed circuit board;

creating a pixelized representation for a conductor layer of the printed circuit board based on the data of a printed circuit board, the pixelized representation having two types of pixels: conductor pixels and dielectric pixels;

analyzing the pixelized representation to identify conductor paths in a direction, the conductor paths being formed by some or all of the conductor pixels;

analyzing the pixelized representation to separate the conductor pixels into net pixels and isolated pixels, the net pixels being pixels on at least one of the conductor paths, and the isolated pixels being pixels on none of the conductor paths;

computing an effective thermal conductivity property value in the direction for a section or a whole of the conductor layer based on a number of the isolated pixels, a number of the net pixels and a number of total pixels in the section or the whole of the conductor layer; and storing the effective thermal conductivity property value on a non-transitory computer-readable medium.

8. The one or more non-transitory computer-readable media recited in claim 7, wherein the computing an effective thermal conductivity property value in the direction comprises:

computing an equivalent heat flow thermal conductivity value in the direction for the section or the whole of the conductor layer based on heat flow thermal conductivity values for lines of pixels, each of the lines of pixels extending from one side of the section or the whole of the conductor layer to other side of the section or the whole of the conductor layer in a second direction, the second direction being perpendicular to the direction, the heat flow thermal conductivity value for each of the lines of pixels being determined based on a number of the net pixels in the each of the lines of pixels; and deriving the effective thermal conductivity property value in the direction by averaging the equivalent heat flow thermal conductivity value in the direction and an equivalent volume fraction thermal conductivity value in the direction and then by correcting the averaging result by a flow length correction factor.

9. The one or more non-transitory computer-readable media recited in claim 8, wherein the flow length correction factor is determined by dividing length of the section or the whole of the conductor layer in the direction by an average length of the conductor paths.

10. The one or more non-transitory computer-readable media recited in claim 8, wherein the equivalent volume fraction thermal conductivity value in the direction is computed based on, a conductor thermal conductivity value, an effective isolated thermal conductivity value for the section or the whole of the conductor layer, the number of the net pixels and the number of total pixels in the section or the whole of the conductor layer, the effective isolated thermal conductivity value being determined based on the conductor thermal conductivity value, a dielectric thermal conductivity value, and the number of the isolated pixels and the number of total pixels in the section or the whole of the conductor layer.

11. The one or more non-transitory computer-readable media recited in claim 10, wherein the conductor thermal conductivity value and the dielectric thermal conductivity value are thermal conductivity values for copper and FR-4 (a woven fiberglass cloth impregnated with an epoxy resin), respectively.

12. The one or more non-transitory computer-readable media recited in claim 10, wherein the equivalent volume fraction thermal conductivity value and the heat flow thermal conductivity values for the lines of pixels are determined based a volume fraction approach.

13. A system, comprising:

one or more processors, the one or more processors programmed to perform a method, the method comprising:

receiving data of a printed circuit board;

creating a pixelized representation for a conductor layer of the printed circuit board based on the data of a printed circuit board, the pixelized representation having two types of pixels: conductor pixels and dielectric pixels;

analyzing the pixelized representation to identify conductor paths in a direction, the conductor paths being formed by some or all of the conductor pixels;

analyzing the pixelized representation to separate the conductor pixels into net pixels and isolated pixels, the net pixels being pixels on at least one of the conductor paths, and the isolated pixels being pixels on none of the conductor paths;

computing an effective thermal conductivity property value in the direction for a section or a whole of the conductor layer based on a number of the isolated pixels, a number of the net pixels and a number of total pixels in the section or the whole of the conductor layer; and storing the effective thermal conductivity property value on a non-transitory computer-readable medium.

14. The system recited in claim 13, wherein the computing an effective thermal conductivity property value in the direction comprises:

computing an equivalent heat flow thermal conductivity value in the direction for the section or the whole of the conductor layer based on heat flow thermal conductivity values for lines of pixels, each of the lines of pixels extending from one side of the section or the whole of the conductor layer to other side of the section or the whole of the conductor layer in a second direction, the second direction being perpendicular to the direction, the heat flow thermal conductivity value for each of the lines of pixels being determined based on a number of the net pixels in the each of the lines of pixels; and deriving the effective thermal conductivity property value in the direction by averaging the equivalent heat flow thermal conductivity value in the direction and an equivalent volume fraction thermal conductivity value in the direction and then by correcting the averaging result by a flow length correction factor.

15. The system recited in claim 14, wherein the flow length correction factor is determined by dividing length of the section or the whole of the conductor layer in the direction by an average length of the conductor paths.

16. The system recited in claim 14, wherein the equivalent volume fraction thermal conductivity value in the direction is computed based on, a conductor thermal conductivity value, an effective isolated thermal conductivity value for the section or the whole of the conductor layer, the number of the net pixels and the number of total pixels in the section or the whole of the conductor layer, the effective isolated thermal conductivity value being determined based on the conductor thermal conductivity value, a dielectric thermal conductivity value, and the number of the isolated pixels and the number of total pixels in the section or the whole of the conductor layer.

17. The system recited in claim 16, wherein the conductor thermal conductivity value and the dielectric thermal conductivity value are thermal conductivity values for copper and FR-4 (a woven fiberglass cloth impregnated with an epoxy resin), respectively.

18. The system recited in claim 16, wherein the equivalent volume fraction thermal conductivity value and the heat flow thermal conductivity values for the lines of pixels are determined based a volume fraction approach.

* * * * *